Patented Sept. 20, 1932

1,878,828

UNITED STATES PATENT OFFICE

CHARLES FREDERICK CROSS, OF LONDON, ENGLAND, AND ALF ENGELSTAD, OF VARDAL, NORWAY

MANUFACTURE OF NEW PRODUCTS COMPRISING LIGNONE DERIVATIVES

No Drawing. Application filed September 15, 1926, Serial No. 135,703, and in Great Britain September 21, 1925.

This invention relates to the manufacture of new products comprising lignone derivatives obtainable as by-products in the manufacture of wood pulp from wood.

In the processes of pulping wood based on the action of aqueous sulphurous acid or bisulphites on the wood, (that is to say, on the action of aqueous solutions containing sulphurous acid anions) the lignone components are obtained in a water-soluble form (conditioned by the acid group $SO_3H$ in combination with the lignone complex) in the liquor; this liquor, after separation from the wood pulp, may be treated in various ways to yield products useful in the industry, for instance in tanning. The liquor may be concentrated, with or without such treatment, and with or without neutralization, until the content of solid material is comparatively high, without considerable loss of fluidity; for example, the liquor may be concentrated until it contains over 50 per cent. of solid material, while still remaining more or less fluid.

We have found that the products which can be made by subjecting to suitable oxidation the lignone derivatives obtainable by the treatment of wood substance with an aqueous solution containing sulphurous acid anions (that is the treatment of wood substance with aqueous sulphurous acid with or without the addition of a proportion of a base, such as lime or magnesia) also possess a high solvent, emulsifying or dispersing power in respect of substances normally immiscible with water, particularly hydrocarbons of high molecular weight. Thus, useful products can be made by mixing in any desired proportion the more concentrated solutions of oxidation products of the aforesaid lignone derivatives, with hydrocarbons of high molecular weight, or with mixtures thereof, such as the tars produced in the destructive distillation of wood, coal or the like, or residues from the distillation of mineral oils, or natural products of a like character. The products may have the appearance of true solutions and may be diluted with water in moderate amounts without causing any appreciable separation; as the dilution is increased, a point is reached at which the product passes into the form of a stable emulsion. The mixtures may also be mixed with many by-products of similar character, such as bitumen, cotton-seed pitch, and oils and fats, such as linseed oil, tung oil, or tallow. Owing to the fact that the mixtures obtained by the invention may contain a considerable quantity of water, they may also be mixed with a number of water-soluble compounds, for instance with many dyestuffs or with suitable inorganic salts, in order to modify the mixtures for particular applications.

When there are used, according to the invention, certain hydrocarbon mixtures of a less fluid nature, such as bitumen, asphalt, or the like, they are first brought into a fluid state by addition of a proportion of a suitable solvent, preferably a solvent hydrocarbon, before mixing with the solution of the lignone derivatives.

In U. S. Letters Patent No. 1,553,220, dated September 8, 1925, to Charles F. Cross, there was described a chromic acid treatment for the production of oxidation products of the lignone derivatives obtainable by the digestion of wood with sulphurous acid, which treatment yields a colloidal product which is insoluble in water and is accompanied by the formation of gels. We have found that the lignone derivatives obtainable by the bisulphite treatment of wood substance behave in an analogous manner and that both in the case of the sulphurous acid products and in the case of the bisulphite products, the presence of the hydrocarbons, tars or the like, as hereinbefore referred to, inhibits this gel-formation. In applying this treatment with chromic acid to the lignone derivatives obtainable by the bisulphite process, however, it is advantageous to treat the liquor to remove combined sulphurous acid, in order to avoid undue consumption of chromic acid. A mixture of a solution of the lignone derivatives of the sulphurous acid or bisulphite process, which has been treated with chromic acid, and the tar, hydrocarbon, or the like, may be applied to surfaces such as wood or iron, as a paint; after application and spontaneous drying, the mixture becomes fixed and insoluble to a greater or lesser degree, and constitutes a protective covering which is more or less resistant towards water. The hydrocarbons, tars or the like, may be added to the solution of the lignone derivatives either before or after, but preferably after, the addition of the chromic acid. Mixtures of the products obtainable by the aforesaid treatment with chromic acid of lignone derivatives obtained by the sulphurous acid or bisulphite treatment of wood substance, and hydrocarbons, particularly hydrocarbons of high specific gravity and viscosity, are also especially suitable for the manufacture of printing inks. Owing to the high dispersive power of the oxidized lignone derivatives in such a mixture, finely divided carbon introduced into the mixture becomes so finely dispersed that the product constitutes a useful printing ink.

The products obtainable in accordance with the invention find application for various purposes for which aqueous emulsions of hydrocarbons are used, particularly as protective paints, and in the manufacture of weather resistant fabrics such as roofing felt.

The high dispersive power of the oxidation products from the lignone derivatives obtainable by the sulphurous acid or bisulphite treatment of wood substance may also be utilized in respect of the dispersion of finely divided solids.

The following examples illustrate the invention:—

(1) The liquor from the sulphurous acid or bisulphite treatment of wood is concentrated until the content of solid matter is about 37 per cent. To 130 parts by weight of this concentrated lignone extract there are added, whilst stirring continuously, 6–8 parts of chromic acid in the form of an aqueous solution of 20 per cent. strength. When the mixture begins to thicken, there are added 50 parts of water, in portions of about 10 parts. 50 parts of coal-tar are then run in, while stirring, and the mixture is finally diluted with water until its volume is about 300 parts. The product is a thin paste, which may be applied to a surface as a paint, with a brush; it may also be used, for example, in the manufacture of a roofing felt or like weather-resistant fabric, by application to the paper or fibre-felts commonly used in such manufacture.

(2) To 130 parts by weight of the concentrated lignone extract as used in Example 1, containing 37 per cent. of solids, there are added, while stirring continuously, 6–8 parts of chromic acid in the form of an aqueous solution of 20 per cent. strength. Before gel-formation sets in, the mixture is run, while stirring, into about 130 parts of a hydrocarbon oil, preferably one having a high specific gravity (e. g. 0.95–0.98) and viscosity; such as the residual oil from mineral oil distillation, as commonly used for lubrication. A highly viscous emulsion is produced, into which is introduced, while stirring, a quantity of finely divided carbon amounting to about 5–7 per cent by weight of the total mixture. A mixture results, throughout which the carbon is dispersed in a fine state of subdivision; it is suitable for use as a printing ink, particularly in high speed machines, and may receive in addition of a suitable coloring matter to correct the brown tone of the carbon. Owing to the large proportion of water retained in the mixture, water-soluble compounds may be added to produce special modifications.

The term "treatment of wood with an aqueous solution containing sulphurous acid anions" used in the appended claims is intended to include the treatment of wood substance with aqueous sulphurous acid in absence of a base, as well as with aqueous sulphurous acid in presence of a base, such as lime or magnesia, or in presence of a small quantity of ammonia, as described in U. S. Patent No. 1,547,907, dated July 28, 1925 to C. F. Cross.

The expression "aqueous dispersions" as used in the appended claims is intended to include any system in which the substance normally immiscible with water (for example, a hydrocarbon of high molecular weight) is dispersed throughout an aqueous medium, whether the substance is in solution in the medium or emulsified or suspended therein.

Having thus described the nature of the said invention and the best means we know of carrying the same into practical effect, we claim:—

1. A method of producing stable aqueous dispersions of substances normally immiscible with water, by mixing the substance with a non-gelatinized concentrated solution constituting the product of the action of chromic acid on a concentrated solution of the soluble lignone derivatives obtainable by the treatment of wood substance with an aqueous solution containing sulphurous acid anions.

2. A method of stabilizing aqueous dispersions of substances normally immiscible with water by mixing the dispersion with a non-gelatinized concentrated solution constituting the product of the action of chromic acid on a concentrated solution of the soluble lignone derivatives obtainable by the treatment of wood substance with an aqueous solution containing sulphurous acid anions.

3. A process for the manufacture of products comprising lignone derivatives, which process consists in mixing a hydrocarbon of high molecular weight with a non-gelatinized concentrated solution constituting the product of the action of cromic acid on a concentrated solution of the soluble lignone derivatives obtainable by the treatment of wood substance with an aqueous solution containing sulphurous acid anions.

4. A process for the manufacture of products comprising lignone derivatives, which process consists in mixing a solution of a hydrocarbon of high molecular weight in a solvent therefor with a non-gelatinized, concentrated solution constituting the oxidation product of the action of chromic acid on a concentrated solution of the soluble lignone derivatives obtainable by the treatment of wood substance with an aqueous solution containing sulphurous acid anions.

5. A process for the manufacture of products comprising lignone derivatives which process consists in making a mixture of a concentrated solution of the soluble lignone derivatives obtainable by the treatment of wood substance with an aqueous solution containing sulphurous acid anions, an aqueous solution of chromic acid and a hydrocarbon of high molecular weight.

6. A process for the manufacture of products comprising lignone derivatives, which process consists in making a mixture of a concentrated solution of the soluble lignone derivatives obtainable by the treatment of wood substance with an aqueous solution containing sulphurous acid anions, an aqueous solution of chromic acid, and a hydrocarbon of high molecular weight and introducing finely divided carbon into the mixture.

7. A process for the manufacture of products comprising lignone derivatives, which process consists in mixing with chromic acid a concentrated solution of the soluble lignone derivatives obtainable by the treatment of wood substance with an aqueous solution containing sulphurous acid anions, and introducing into the mixture, before it gelatinizes, a substance normally immiscible with water.

8. A process for the manufacture of products comprising lignone derivatives, which process consists in mixing with chromic acid a concentrated solution of the soluble lignone derivatives obtainable by the treatment of wood substance with a solution containing sulphurous acid anions, and introducing into the mixture, before it gelatinizes, a hydrocarbon of high molecular weight.

9. As a new composition of matter, an aqueous dispersion of a substance normally immiscible in water, containing as a dispersing agent the products of the reaction between chromic acid and the lignone derivatives obtainable by the treatment of wood substance with an aqueous solution containing sulphurous acid anions.

10. As a new composition of matter, an aqueous dispersion of a hydrocarbon of high molecular weight, containing as a dispersing agent the products of the reaction between chromic acid and the lignone derivatives obtainable by the treatment of wood substance with an aqueous solution containing sulphurous acid anions.

11. As a new composition of matter, an aqueous medium containing dispersed throughout it a hydrocarbon of high molecular weight and finely divided carbon and containing as a dispersing agent the products of the reaction between chromic acid and the lignone derivatives obtainable by the treatment of wood substance with an aqueous solution containing sulphurous acid anions.

12. As a new article of manufacture, a material having on a surface thereof a weatherproof coating comprising a hydrocarbon of high molecular weight and gelatinized products of the reaction between chromic acid and lignone derivatives obtainable by the treatment of wood substance with an aqueous solution containing sulphurous acid anions.

13. As a new article of manufacture, a weather-resistant fabric containing as an impregnation composition comprising a hydrocarbon of high molecular weight and gelatinized products of the reaction between chromic acid and lignone derivatives obtainable by the treatment of wood substances with an aqueous solution containing sulphurous acid anions.

In testimony whereof we have signed our names to this specification.

CHARLES FREDERICK CROSS.
ALF ENGELSTAD.